United States Patent
Severin (10) Patent No.: US 9,730,511 B2
(45) Date of Patent: Aug. 15, 2017

(54) DEVICE FOR FASTENING A TABLE TOP ON A SUBSTRUCTURE

(71) Applicant: Severin Holz und Kunststoff GmbH, Ense (DE)

(72) Inventor: Heinz-Bernd Severin, Soest (DE)

(73) Assignee: Severin Holz und Kunststoff GmbH, Ense (DE)

( * ) Notice: Subject to any disclaimer, the term of this patent is extended or adjusted under 35 U.S.C. 154(b) by 0 days.

(21) Appl. No.: 14/414,122

(22) PCT Filed: Jul. 5, 2013

(86) PCT No.: PCT/EP2013/064240
§ 371 (c)(1),
(2) Date: Apr. 16, 2015

(87) PCT Pub. No.: WO2014/009268
PCT Pub. Date: Jan. 16, 2014

(65) Prior Publication Data
US 2016/0022029 A1 Jan. 28, 2016

(30) Foreign Application Priority Data
Jul. 10, 2012 (DE) .................... 20 2012 102 539 U (51) Int. Cl.
*F16M 11/20* (2006.01)
*A47B 13/00* (2006.01)
*F16B 12/16* (2006.01)
*A47B 13/02* (2006.01)
(Continued)

(52) U.S. Cl.
CPC ............. *A47B 13/003* (2013.01); *F16B 12/16* (2013.01); *A47B 13/021* (2013.01); *F16B 12/42* (2013.01); *F16B 12/48* (2013.01)

(58) Field of Classification Search
CPC ........ A47B 9/14; A47B 13/088; A47B 13/003
See application file for complete search history.

(56) References Cited

U.S. PATENT DOCUMENTS 3,347,509 A * 10/1967 Blink ........................ A47B 3/12
108/150
3,695,457 A * 10/1972 Cohen ........................ A47F 5/13
211/189

(Continued)

*Primary Examiner* — Amy Sterling
(74) *Attorney, Agent, or Firm* — Michael Soderman (57) ABSTRACT

The present invention relates to a device for fastening a table top on a substructure which comprises a fastening means which can be screwed to the underside of the table top, in particular a fastening means with a fastening cross, fastening plate or the like, on which the table top rests, wherein said fastening means has a defined pattern of holes with a plurality of holes or mounts for fastening screws, which can be plugged through said holes in each case and by way of which the fastening means is screwed to the table top. According to the invention, the table top (10) has slots (11) or grooves which are made in its underside and run such that, when the table top is placed in position on the fastening means, in particular the fastening cross, they coincide with the holes (20) or mounts of the fastening means, in particular of the fastening cross (17), wherein fastening screws which can be screwed into the table top (10) in each case in the region of the slots (11) or grooves are provided.

10 Claims, 5 Drawing Sheets

(51) Int. Cl.
F16B 12/42 (2006.01)
F16B 12/48 (2006.01)

(56) References Cited

U.S. PATENT DOCUMENTS

| | | | | |
|---|---|---|---|---|
| 5,718,179 | A * | 2/1998 | Johnson | A47B 13/021 108/153.1 |
| 6,047,648 | A * | 4/2000 | Alm | A47B 87/002 108/157.16 |
| 7,757,617 | B2 * | 7/2010 | Larcom | A47B 3/0815 108/132 |
| 8,261,676 | B2 * | 9/2012 | VanNimwegen | A47B 3/0912 108/125 |
| 8,485,769 | B2 * | 7/2013 | Rosenkranz | F16B 1/0071 411/14 |

* cited by examiner

Detail M 1:2

DEVICE FOR FASTENING A TABLE TOP ON A SUBSTRUCTURE

CROSS-REFERENCE TO RELATED APPLICATIONS

This application is the U.S. national stage of International Application No. PCT/EP2013/064240 filed on Jul. 5, 2013, and claims the benefit thereof. The international application claims the benefit under 35 USC 119 of German Application No. DE 20 2012 102 539.6 filed on Jul. 10, 2012; all applications are incorporated by reference herein in their entirety.

BACKGROUND

The present invention relates to a device for fastening a table top on a substructure, which comprises a fastening cross to be screwed to the underside of the table top or some other fastening means involving a fastening plate or the like, on which the table top rests, wherein this fastening cross has a defined hole pattern with several holes or mounts for respective fastening screws that are to be plugged through these holes and used to screw the fastening cross to the table top.

According to current prior art, manufacturers of table tops made out of HPL (high pressure laminate) materials deliver the latter to wholesalers or secondary operations, which make tables out of them by mounting the table tops onto substructures of varying shape and size per customer request. The problem here is that the available substructures vary greatly in terms of type, shape and size. As a rule, the underside of the table top is mounted on a fastening cross, for example which exhibits four or eight holes or mounts for screws at several locations for securing the table top. Since the fastening crosses for the substructures exhibit highly variable hole patterns, the supplier for each of these different substructures would have to deliver a table top with a correspondingly matching drilling pattern, so that the table top would fit onto the respective substructure. This results in a very expensive stock inventory at the wholesaler or secondary operation that assembles the tables.

As an alternative, it would also be possible for the assembling operation to procure table tops without drill holes and drill the necessary holes during assembly depending on the substructure onto which the respective table top is to be mounted. However, this is a relatively difficult process that requires high-end machinery with which the drill holes can be drilled into the table tops with sufficient precision, as well as correspondingly trained personnel. It must be considered that the HPL material that usually goes into making these table tops is a material with a comparatively large hardness, so that tools comprised of diamond or carbide are required for machining purposes. However, the assembling operations are set up more like commercial enterprises and have no industrial manufacturing of their own, so that they usually lack the machinery and trained personnel. Another potential alternative is an adhesive bond, but it would not yield a durable, reliable bond owing to the alternating heat and humidity ranges encountered during use indoors and outdoors.

DETAILED DESCRIPTION

Proceeding from the aforementioned prior art, the object of the present invention is to make available a device for fastening a table top on a substructure of the kind indicated at the outset that makes it possible to fasten the table top to the wide range of fastening crosses available on the market or to alternative fastening means for the table substructures.

This object is achieved with a device for fastening a table top on a substructure of the kind mentioned at the outset having the characterizing features in claim 1.

In most cases, the hole pattern of the fastening means mentioned at the outset encompasses four or eight holes, for example. However, the invention is set up in such a way as to also cover other conventional hole patterns.

The invention provides that the underside of the table top exhibits slots or grooves that run in such a way as to align with the holes or mounts of the fastening means when placing the table top on the fastening cross, and that fastening screws are provided, preferably self-tapping screws, but also metric or plastic screws, which can be screwed into the table top in the respective area of the slots or grooves. These slots or grooves each have a longitudinal extension of the kind that covers all areas where drill holes are required for the different fastening means.

As s result of this solution, fastening holes already existing on the commercially available fastening means can be used for securing the fastening means to the table top. The fastening screw must only be plugged through the fastening hole, after which it hits a slot in the table top. Since the screws exhibit a higher material strength than the table top, they can then be screwed directly into the slot of the table top. The drilling process is no longer required during assembly operations. Since the fastening means, e.g., fastening crosses, as a rule always exhibit fastening holes on their support arms independently of their specific shape and size, and these support arms as a rule also cross each other at roughly a right angle due to the cross shape, the fastening holes then always come to align somewhere with the slots correspondingly introduced into the table top by the manufacturer.

Another preferred further development of the invention provides that at least one slot or one groove extends along a line as seen from a top view of the underside of the table top whose linear elongation passes through the midpoint of a table top having a circular, rectangular, quadratic or polygonal contour. At least two slots or grooves are preferably provided, each extending along lines as seen from a top view of the underside of the table top whose respective elongations cross in roughly the area of the midpoint of a table top having a circular, rectangular, quadratic or polygonal contour. It is especially preferred for at least two slots or grooves to be present that each extend along a line as seen from a top view of the underside of the table top whose respective elongations cross at roughly a right angle in roughly the area of the midpoint of a table top having a circular, rectangular, quadratic or polygonal contour.

This makes it possible to largely cover the hole patterns in conventional types of fastening means that are usually used in fastening table tops on substructures.

For example, the table tops can consist of HPL materials, which have a relatively large hardness. The slots or grooves can be milled into the underside of the table tops by the manufacturer, for example, for which purpose diamond or carbide milling cutters can be used. Since a comparatively higher level of wear arises on the tool in the milling process given the hardness of the table tops, it is recommended that the slots not be allowed to traverse the entire length from the midpoint of the table top to the outer edge, but rather that oblong slots be introduced that extend along a line but can be interrupted by non-slotted areas. A row of such slots or grooves can then still always be used to cover the expected hole pattern of the conventional fastening crosses.

For example, the slots or grooves can extend along a line extending through the midpoint of the table top as seen from a top view of the underside of the table top, with at least one slot or groove being located on one side of the midpoint, and at least one slot or groove being located on the other side of the midpoint. Given a rectangular or quadratic or polygonal table top, the midpoint in this sense is the intersection of the diagonals.

The advantage to the solution according to the invention lies in the fact that the slots or grooves are introduced into the underside of the table top by the manufacturer. As a consequence, the assembly operation does not have to drill into the table top. In turn, the advantage for the manufacturer is that it no longer has to manufacture, have available, or fabricate on request numerous different table tops with varying drilling patterns, which would complicate logistics. It now only manufactures just one type of plate with the respectively required contour and size, for example quadratic, round, rectangular, hexagonal, freeform, etc., each with a uniform slot pattern.

In addition, the manufacturer has the machinery suitable for milling a very precise slot pattern into the plate, for example, in such a way that as to provide a respectively sufficient slot depth for a secure attachment to the fastening cross on the one hand, and prevent the slots from extending so deeply into the plate that the depth weakens the plate on the other. As has been empirically demonstrated, the slot depth selected for this purpose is preferably such that, in terms of their depth, the slots or grooves extend into the table top at least over roughly half its the material thickness to about four fifths of its material thickness. For example, when using table tops with a plate thickness of 13 mm, a slot depth of between at least 6.5 mm, with 8 mm being preferred given sufficient room, and at most 11 mm is especially preferred. Naturally, this also depends among other things on the used plate material and length and thickness of the used fastening screws.

The slot width is preferably selected in such a way that the respective width of the slots measures roughly 75% to about 90% of the diameter of the fastening screws used to fasten the table top on the fastening cross in the thread area. It can be advantageous to use self-tapping screws as the fastening screws, for example. Care must be taken with respect to the slot width that the slots not be so wide as to deny the self-tapping screw a sufficient foothold, but also that the slots not be too narrow, since the screwing process would otherwise require too much force during subsequent assembly. For example, when using M5 screws for fastening purposes, the slot width should hence measure between roughly 3.75 mm and about 4.5 mm.

The features described in the subclaims relate to preferred further developments of the solution to the object according to the invention. Additional advantages to the present invention may be gleaned from the following detailed description.

BRIEF DESCRIPTION OF THE DRAWINGS

The present invention will be explained in more detail below based upon exemplary embodiments, making reference to the attached drawings. Shown on.

DETAILED DESCRIPTION OF THE PREFERRED EMBODIMENTS

Figure 1A:
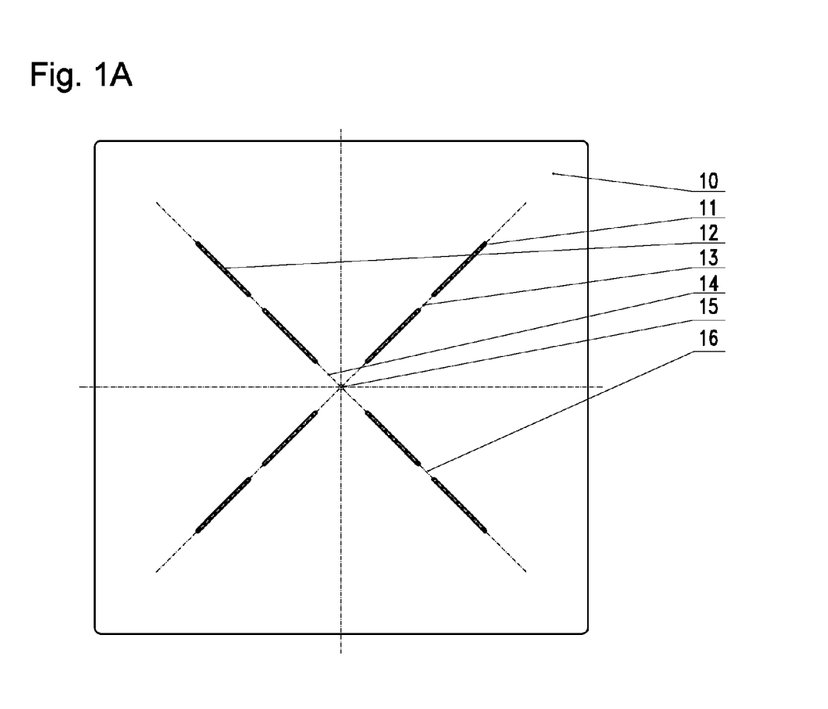
FIG. 1A is a top view of the underside of an exemplary rectangular table top according to the invention with a slot pattern in a diagonal layout.
Figure 1B:
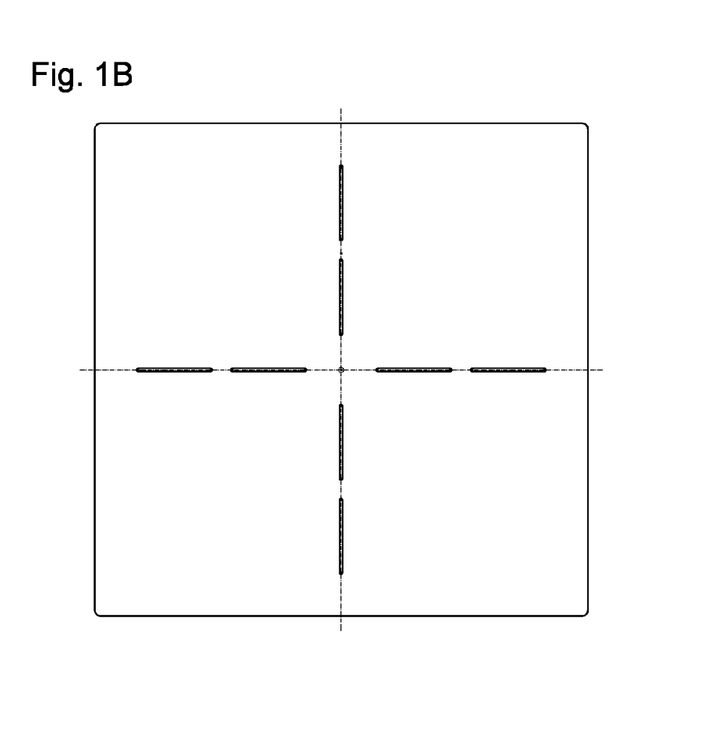
FIG. 1B shows the top view of FIG. 1A with a rectangular layout.

Reference will first be made to FIGS. 1A and 1B, which present a schematically simplified view of the underside of the table top according to the invention. The table top itself is marked with reference number 10, and in the present case has a quadratic outline, for example. In the example, the slots 11, 12 according to the invention extend along two diagonally running lines 13, 14, which run through the midpoint 15 of the table top, and there intersect at a right angle. As a consequence, the two lines are here aligned with the two diagonals in the square of the contour of table top 10. However, the slots 11, 12 themselves do not pass through the midpoint 15 in the exemplary embodiment. The slots extend along a respective one of the two lines 13, 14, and also do not proceed all the way to the outer corner of the table top 10, but rather stop some distance before it. In addition, the slots 11, 12 are each interrupted in the direction of the lines 13, 14 by non-slotted areas 16 of the table top.

This type of slot pattern is sufficient to cover a plurality of varying hole patterns for holes in the fastening means with the smallest possible overall slot length.

An extension of the slots 11, 12 over the respective entire diagonal of the table top 10 is not necessary, and would lead to greater wear on the tools used to introduce the slots. In addition, the goal is not to introduce any more slots into the table top 10 than absolutely necessary, so as to prevent the material from weakening, and thus avoid a risk of breakage. In the exemplary embodiment according to FIGS. 1A and 1B, a total of four slots 11 or 12 are present on the two intersecting diagonal lines 13, 14, of which two adjacent slots 11, 12 each are interrupted by a respective non-slotted area 16. Therefore, a total of eight slots are present in the table top 10 according to FIGS. 1A and 1B, between which a total of six non-slotted areas lie, wherein the slots end a distance from the corners of the table top, and wherein the central area of the table top is also not slotted. However, an interruption of the slots is technically unnecessary, but rather serves exclusively to prolong the service life of the tools, as well as to enhance the stability of the table top. The slot pattern is rotated by 45° in FIGS. 2A and 2B. This position rotated around the midpoint can also be realized, just like any another. The slots need also not be symmetrical in terms of arrangement or length.

Figure 2A:
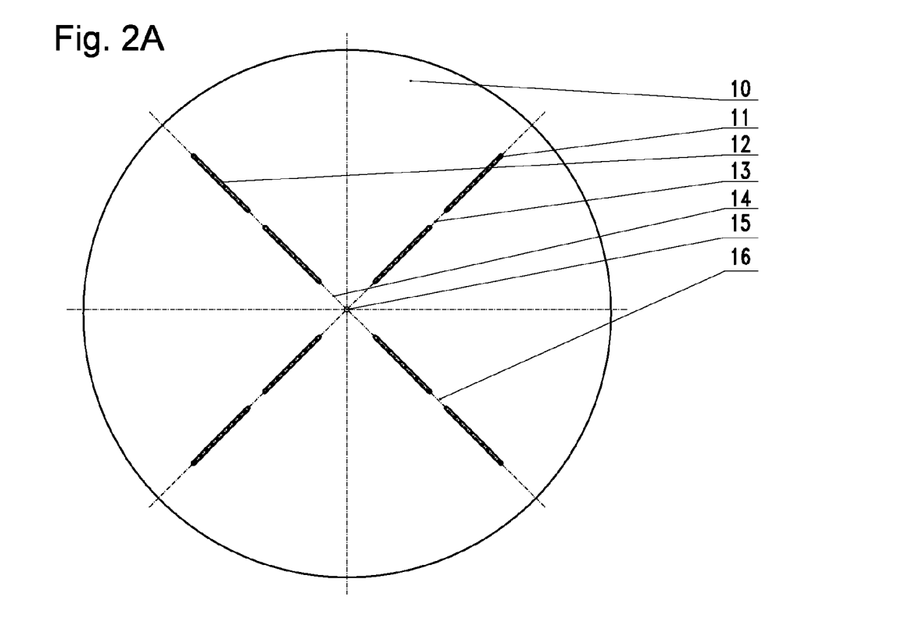
FIG. 2A is a top view of the underside of an exemplary round table top according to the invention with a slot pattern in a diagonal layout.
Figure 2B:
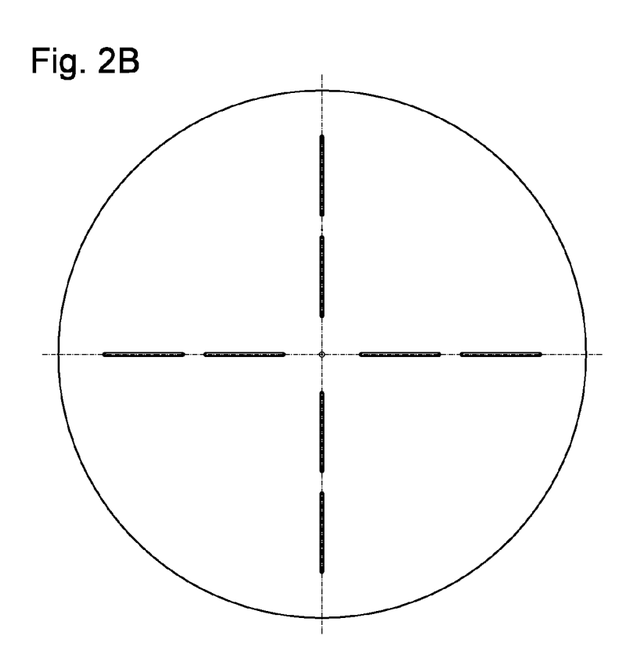
FIG. 2B shows the top view of FIG. 2A with a rectangular layout.

FIGS. 2A and 2B show a second exemplary embodiment of the present invention, wherein the table top 10 here exhibits a circular contour. As evident in comparison to FIGS. 1A and 1B, the pattern of slots 11, 12 and non-slotted areas 16 in FIGS. 2A and 2B is similar to the exemplary embodiment according to FIGS. 1A and 1B. The lines along which the slots extend here pass through the midpoint of the circular table top 10, and there intersect at a right angle. As a consequence, two radii of the circular shape intersecting at a right angle are here involved, so that the slots lie on a cross-shaped arrangement, which roughly corresponds to the progression of the arms of a fastening cross depicted on FIG. 4A. As demonstrated by a comparison between FIGS. 1A and 1B and FIGS. 2A and 2B, the same fastening crosses can be used for both table tops.

Figure 3A:
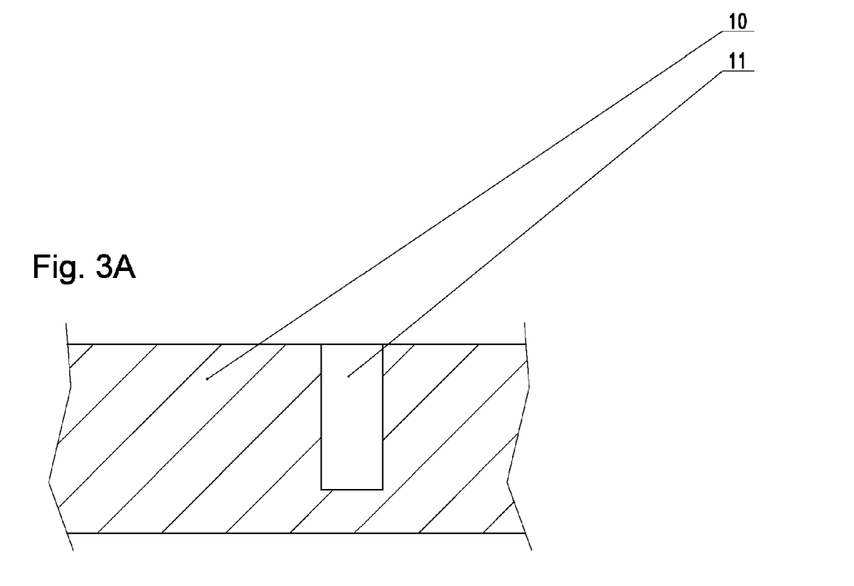
FIG. 3A is a detailed view of a section through a table top in a longitudinal section in the area of a rectangular slot cut transverse to the slot.
Figure 3B:
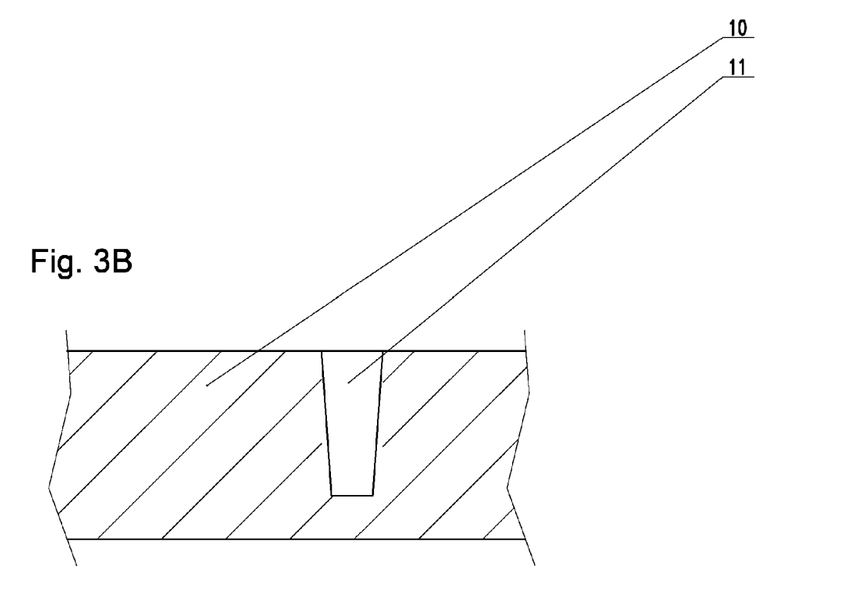
FIG. 3B is the detail view of FIG. 3A with a wedge-shaped slot cut transverse to the slot.

FIGS. 3A and 2B show a small cutout of a vertical section through a table top 10 in the area of one of the slots 11. As evident here, the slot is milled into the table top like a groove, so that it extends through most of the material thickness of the table plate, but of course does not pass completely through the latter. The slot is here cut transverse to its longitudinal extension, and thus reveals the width of the slot, which is somewhat less than the thread dimensions of the fastening screws used for attachment purposes, thereby ensuring that the screw cuts into the table top on the sides of the slot. As depicted on FIG. 3B, this function can also be realized with a conically tapering slot.

Figure 4A:
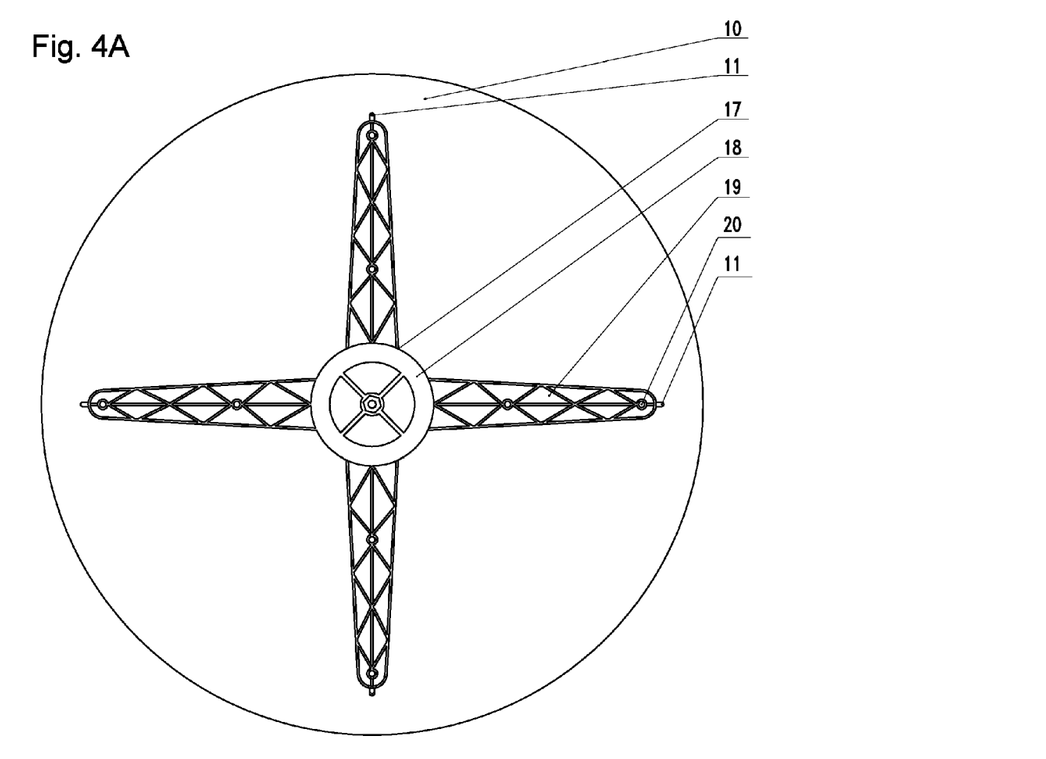
FIG. 4A is a view of the underside of a table top with fastening cross applied.
Figure 4B:
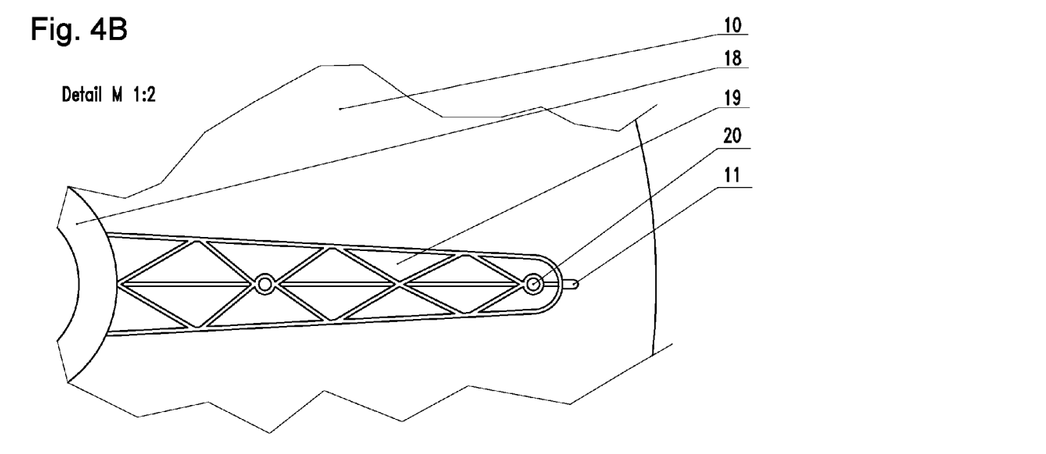
FIG. 4B is a detailed view of one of the support arms.

FIG. 4A presents a view of the underside of a table top 10, shown with a fastening cross 17 of the substructure. Such a fastening cross 17 is screwed onto the table top 10, wherein a post or the like is in turn secured to the fastening cross 17. These types of fastening means are available on the market in different shapes and sizes. As shown on FIG. 4A, the latter usually have four support arms 19 arranged like a cross and extending from a roughly round central piece 18 that accommodate various holes 20 through which the fastening screws (not depicted here, see FIGS. 5A, 5B and 5C) are then plugged and screwed into the table top 10. As evident, these holes 20 can be located at various positions of the fastening cross 17, in part radially more outwardly and in part radially more inwardly on the support arms 19. Since different fastening crosses are used and these holes can thus be located at the most varied of positions relative to the table top, it is advantageous to introduce the slots 11 into the table top 10 as described in the invention. With the fastening cross placed on the table top, the slots 11 obviously extend roughly along the middle of the support arms, where the holes 20 are located, so that a slot is always situated under a hole after placement of the fastening cross.

Figure 5A:
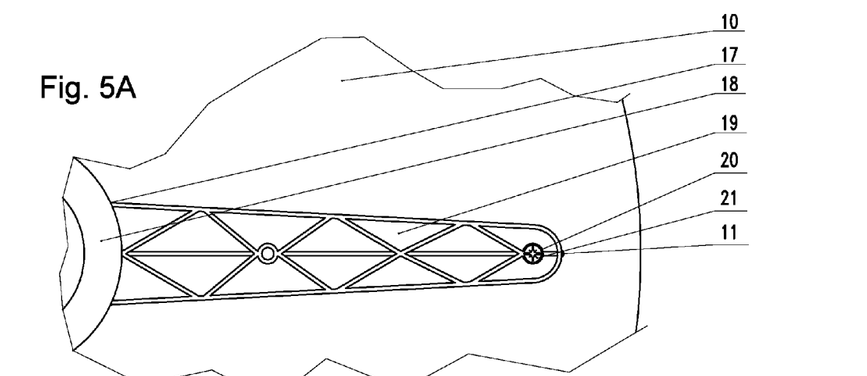
FIG. 5A is a magnified detailed view of a section from FIG. 4A, wherein a self-tapping fastening screw is visible.
Figure 5B:
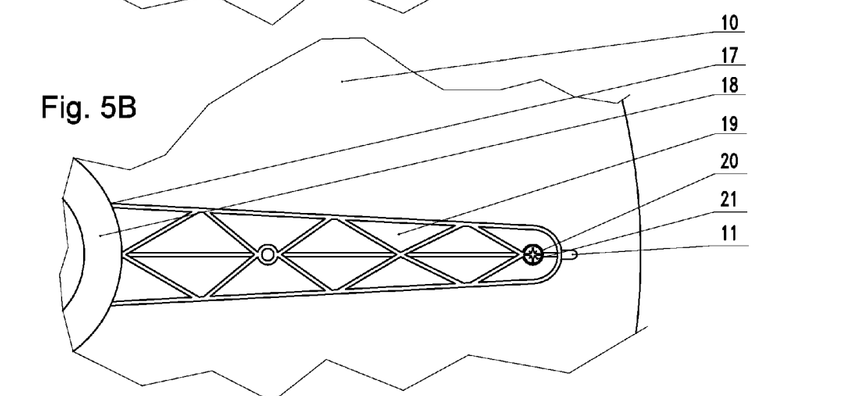
FIG. 5B shows the detailed view of FIG. 5A with the support arm further to the left with respect to the slot.
Figure 5C:
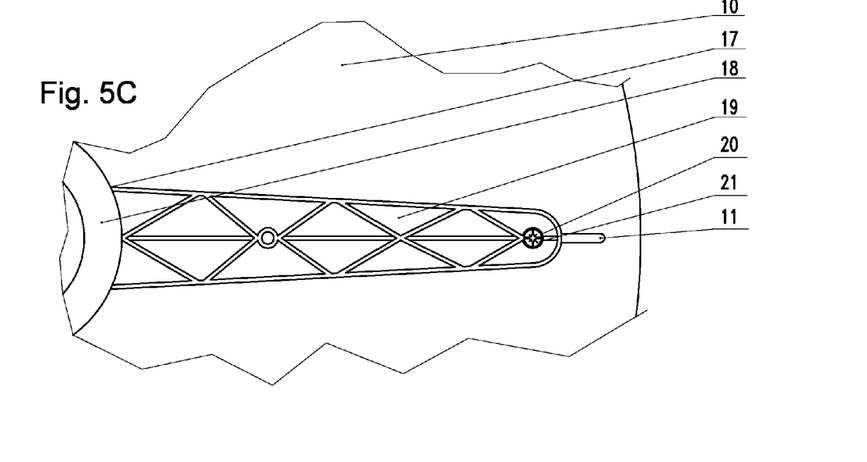
FIG. 5C shows the detailed view of FIG. 5A with the support arm even further to the left with respect to the slot.

FIGS. 5A, 5B and 5C present a magnified detailed view of one of the support arms 19 of the fastening cross 17, wherein the slot 11 of the table top obviously extends radially even more outward, making the screw position variable, and, for example, making it possible to also screw on a larger fastening cross with holes lying further outward. Also evident from FIGS. 5A, 5B and 5C is one of the fastening screws 21, wherein a self-tapping (self-cutting) screw was used in this case, which passes through the hole 20, and can be screwed into the slot 11, which is somewhat narrower than the screw thread, in such a way as to retain the screw.

LIST OF REFERENCE NUMERALS

10 Table top
11 Slot
12 Slot
13 Line
14 Line
15 Midpoint
16 Non-slotted areas
17 Fastening cross
18 Central piece
19 Support arms
20 Holes
21 Fastening screws

The invention claimed is:

1. A device for fastening a table top on a substructure, which comprises a fastening cross to be screwed to the underside of the table top on which the table top rests, wherein this fastening cross has a defined hole pattern with several holes or mounts for respective fastening screws that are to be plugged through these holes and used to screw the fastening cross to the table top, characterized in that the underside of the table top (10) exhibits slots (11) or grooves that run in such a way as to align with the holes (20) or mounts of the fastening cross when placing the table top on the fastening cross and that fastening screws (21) are provided, which can be screwed into the table top (10) in the respective area of the slots (11) or grooves, wherein four slots are present on each of two intersecting diagonal lines, and sets of two adjacent slots are interrupted in each case by a non-slotted area, creating a total of eight slots, between which there is a total of six non-slotted areas, wherein the slots end at a distance from the corners of the table top and wherein the central area of the table top is also not slotted, wherein said slots lie in a cross-shaped arrangement corresponding to the progression of arms of the fastening cross.

2. The device for fastening a table top on a substructure according to claim 1, characterized in that at least one slot (11) or one groove extends along a line as seen from a top view of the underside of the table top (10) whose linear elongation passes through the midpoint (15) of a table top (10) having a circular, rectangular, quadratic, polygonal or freeform contour.

3. The device for fastening a table top on a substructure according to claim 1, characterized in that at least two slots (11) or grooves extend along lines (13, 14) as seen from a top view of the underside of the table top (10) whose respective elongations cross in roughly the area of the midpoint (15) of a table top (10) having a circular, rectangular, quadratic or polygonal contour.

4. The device for fastening a table top on a substructure according to claim 1, characterized in that at least two slots (11) or grooves extend along lines (13, 14) as seen from a top view of the underside of the table top (10) whose respective elongations cross at roughly a right angle in roughly the area of the midpoint (15) of a table top (10) having a circular, rectangular, quadratic, polygonal or freeform contour.

5. The device for fastening a table top on a substructure according to claim 1, characterized in that at least two slots (11) or grooves are provided along a line (13, 14) extending roughly through the midpoint (15) of the table top (10) as seen from a top view of the underside of the table top, with at least one being located on one side of the midpoint, and at least another being located on the other side of the midpoint.

6. The device for fastening a table top on a substructure according to claim 1, characterized in that, in terms of their depth, the slots (11) or grooves extend into the table top (10) at least over roughly half its the material thickness to about four fifths of its material thickness.

7. The device for fastening a table top on a substructure according to claim 1,
characterized in that a total of at least four, preferably of about four to eight, slots (11) or grooves, each interrupted by non-slotted areas (16) of the table top (10), are provided, which are situated along two intersecting lines (13, 14).

8. The device for fastening a table top on a substructure according to claim 1, characterized in that the respective width of the slots (11) measures roughly 75% to about 90% of the diameter of the fastening screws (21) used to fasten the table top (10) on the fastening cross (17) in the thread area.

9. The device for fastening a table top according to claim 1, characterized in that the table top (10) consists of a high pressure laminate material.

10. The device for fastening a table top according to claim 1, characterized in that self-tapping screws are used as the fastening screws.

\* \* \* \* \*